March 10, 1942.   A. R. SEATON   2,275,869
RELEASE CLIP
Filed May 9, 1941
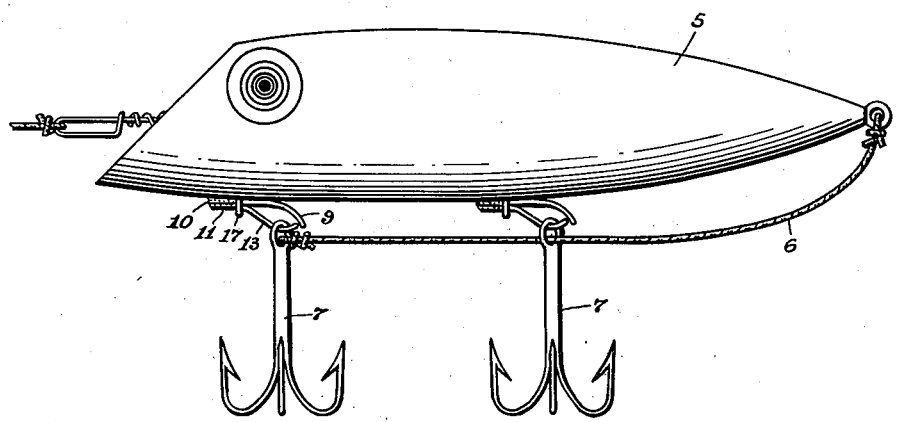
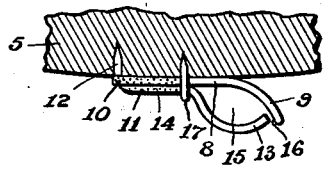
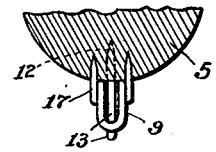
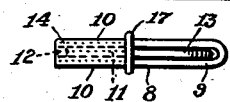
Inventor
*Allan R. Seaton*
By
*John W. Maupin.*
Attorney Patented Mar. 10, 1942

2,275,869

UNITED STATES PATENT OFFICE 2,275,869

RELEASE CLIP

Allan R. Seaton, Seattle, Wash.

Application May 9, 1941, Serial No. 392,741

3 Claims. (Cl. 43—28)

My invention relates to release clips, and more particularly to a spring clip adapted to be fastened to a fish lure or plug and to release a fish hook connected thereto when a predetermined pull is exerted on the hook by a fish.

Certain objects of the invention are to provide a release clip made of rustless stout steel spring wire and consisting of a looped lip having a curved tongue connected thereto and arranged in such cooperative relation therewith that a fish hook, when suspended by its eye to the curved tongue and between said lip and tongue, is pulled free and clear of the device when a fish of sufficient weight is caught on the hook. Other objects are to provide simple and novel means for securing the release clip to a lure or plug.

This clip is particularly adapted for use in salmon fishing in connection with lures or plugs of the "drop string" type wherein the hooks are secured to a string that is connected to the tail or other part of the lure so that, when a fish is caught on one of the hooks and the hook is released from the clip, it will drop down and trail behind the lure when it is being towed through the water. This type of lure is made in different forms with different numbers of hooks connected to its drop string, and forms no part of my invention except insofar as it may enter into novel combination therewith.

In the drawing:

Figure 1 is a view in side elevation of a fish lure with two of the release clips secured thereto;

Fig. 2 is an enlarged detail view in side elevation showing one of the clips secured to a fragmentary portion of a lure;

Fig. 3 is a bottom plan view of the clip; and

Fig. 4 is a view in rear elevation of Fig. 2.

Referring in detail to the drawing wherein like reference numerals indicate like parts in the several views, the numeral 5 designates a wooden fish lure having a drop string 6 connected to its tail, and a pair of fish hooks 7 connected to the string in any desired manner. The release clip first comprises an upper jaw member 8 which is made by looping or bending a piece of stout spring steel wire back upon itself in slightly spaced apart relation. The bent end portion of this jaw is curved downward to form a lip 9, thus leaving its arm portions straight as at 10.

The lower jaw member of the release clip, which is also made of stout spring steel wire, consists of a straight portion 11, a pointed end portion 12, and a curved tongue portion 13. The straight portion 11 of this jaw is joined to the straight arm portions 10 of the upper jaw member 8 by solder or other suitable cementing material as shown by dots or stipples at 14 in Figs. 2 and 3 of the drawing to form a straight body portion. The tongue 13 is curved in opposite directions to that of the curved end portion 9 of the upper jaw 8 to form a loop 15, and a small gap 16 is left between the ends of said tongue and the lip 9 as shown in Fig. 2. When installing the clip, its pointed end 12 is forced into the wooden lure 5 until its straight body portion is tight against the bottom of the lure. A staple 17, or other fastening means, is then forced into the lure astride the clip where its straight body portion joins the tongue 13.

In the use of this release clip, the eye of a fish hook, such as shown at 7 in Fig. 1, is inserted into the loop 15 and forced back and around the tongue 13 by slightly expanding the small gap 16 between the ends of said tongue and the lip 9. The hook is thus suspended from the curved tongue 13 as shown in Fig. 1, and when a fish of sufficient size and weight is caught on the hook the force of its sudden pull overcomes the tension of the spring lip 9 and tongue 13 whereby the hook is pulled free and clear of the clip as will be understood. The device is primarily intended for salmon fishing, and is preferably set to release a hook at a pull of about six pounds which is the average weight of a small salmon. This setting is made by manipulating the tongue 13 and the lip 9, it being understood that in curving them more toward each other the pull required to release the hook will be increased. In making this adjustment when manipulating the tongue and lip, a pair of spring scales may be used by repeatedly pulling the fish hook free until the desired release point is indicated in pounds on the scales.

I claim:

1. As an article of manufacture, a release clip consisting of an upper jaw made of stout spring steel wire bent upon itself in parallel relation, the bent end portion of said jaw curved downward to form a lip and leaving a straight parallel arm portion, a lower jaw made of stout spring steel wire having a straight portion joined to the straight portion of the upper jaw, and a downwardly and upwardly curved portion forming a loop in its cooperative relation with the curved portion of the upper jaw.

2. As an article of manufacture, a release clip consisting of an upper jaw made of stout spring steel wire bent upon itself in parallel relation, the bent end portion of said jaw curved downward to form a lip and leaving a straight parallel arm portion, a lower jaw made of stout spring steel wire having a straight portion joined to the straight portion of the upper jaw, a pointed end extending at right angles from the straight portion of the lower jaw, the remainder of the lower jaw curved downwardly and upwardly to form a loop in its cooperative relation with the curved portion of the upper jaw, and the ends of the curved portions of the upper and lower jaws terminating in close proximity to each other.

3. The combination with a fish lure, of a release clip consisting of a straight body portion bearing against the bottom of the lure, and a right angle pointed end imbedded in the lure, another fastening means imbedded in the lure at the other end of the straight body portion, and opposing spring steel jaws joined to the straight body portion and forming a loop with its ends disposed in proximity to each other for the purpose specified.

ALLAN R. SEATON.